United States Patent [19]

Madgavkar et al.

[11] 4,299,086

[45] * Nov. 10, 1981

[54] UTILIZATION OF ENERGY OBTAINED BY SUBSTOICHIOMETRIC COMBUSTION OF LOW HEATING VALUE GASES

[75] Inventors: Ajay M. Madgavkar, Pittsburgh; Roger F. Vogel, Butler; Harold E. Swift, Gibsonia, all of Pa.

[73] Assignee: Gulf Research & Development Company, Pittsburgh, Pa.

[ * ] Notice: The portion of the term of this patent subsequent to Mar. 4, 1997, has been disclaimed.

[21] Appl. No.: 967,170

[22] Filed: Dec. 7, 1978

[51] Int. Cl.³ .................................................. F02C 3/22
[52] U.S. Cl. ..................................... 60/39.06; 60/723; 60/39.46 G; 431/10
[58] Field of Search .................... 60/723, 39.12, 39.06, 60/39.46 G; 431/10

[56] References Cited

U.S. PATENT DOCUMENTS

| | | | |
|---|---|---|---|
| 3,731,485 | 5/1973 | Rudolph et al. | 60/39.12 |
| 3,928,961 | 12/1975 | Pfefferle | 60/723 |
| 3,982,879 | 9/1976 | Pfefferle | 431/10 |
| 4,054,407 | 10/1977 | Carrubba et al. | 431/10 |
| 4,191,733 | 3/1980 | Swift et al. | 423/247 |

FOREIGN PATENT DOCUMENTS

| | | | |
|---|---|---|---|
| 510001 | 2/1955 | Canada | 60/39.46 G |
| 741506 | 12/1955 | United Kingdom | 60/723 |

*Primary Examiner*—Robert E. Garrett
*Attorney, Agent, or Firm*—Deane E. Keith; Forrest D. Stine; Donald L. Rose

[57] ABSTRACT

The combustible component of a gas stream of low heating value is combusted using less than a stoichiometric amount of oxygen in the presence of an oxygenation catalyst and the heat energy in the combusted gas is utilized, for example, by expansion in a gas turbine.

14 Claims, No Drawings

UTILIZATION OF ENERGY OBTAINED BY SUBSTOICHIOMETRIC COMBUSTION OF LOW HEATING VALUE GASES

SUMMARY OF THE INVENTION

This invention relates to the catalyzed combustion of combustible gases of low heat content using less than a stoichiometric amount of oxygen and to the utilization of the heat energy in the combusted gas stream, such as by expansion in a gas turbine.

DETAILED DESCRIPTION OF THE INVENTION

Hydrocarbon vapors or other gases of high heating value have for centuries been burned as a source of energy for heating purposes or as a source of motive power for driving machinery. Such combustion is purposely carried out with sufficient air to accomplish complete combustion of the hydrocarbon gas to carbon dioxide and water.

In contrast, hydrocarbon-containing gas streams of low heating value, such as waste gas streams, have traditionally been discharged to the atmosphere. In recent years a greater recognition and concern about atmospheric pollution has led to legal standards controlling the direct emission to the atmosphere of waste gases containing significant amounts of hydrocarbons and/or carbon monoxide. In order to avoid atmospheric pollution, the hydrocarbon components in a waste gas stream of low heating value are generally combusted to carbon dioxide and water using an oxidation catalyst and a stoichiometric excess of oxygen for direct venting to the atmosphere. Examples of this procedure are numerous in the various manufacturing and industrial arts.

Recognizing the fact that a large amount of energy is contained in a large volume of low heating value gas, waste gas streams of low heating value are occasionally completely combusted and energy is removed in a boiler or in a turbine before venting to the atmosphere. U.S. Pat. Nos. 2,449,096, 2,720,494 and 2,859,954 are examples of this latter concept of completely burning residual combustibles in a waste gas stream and recovering energy from the combusted gas stream before it is vented to the atmosphere. However, the useful arts do not appear to contemplate the intentional partial combustion of a waste gas stream of low heating value with energy recovery from the partially combusted gas stream prior to venting it to the atmosphere.

In order to oxidize the hydrocarbon portion in a diluted hydrocarbon stream, such as a mixture of methane and nitrogen, with a stoichiometric or excess amount of air, a suitable oxidation catalyst is required. A platinum-base catalyst is generally considered to be the most effective catalyst for this oxidation. The gas stream must be heated to its ignition, or light off, temperature, which depends on the particular composition of the gas undergoing combustion as well as the particular catalyst being used, prior to contacting the gas stream with the catalyst. If the catalyst is provided in a suitable physical form to provide adequate contact of the gas with the catalyst, substantially complete combustion of the hydrocarbon to carbon dioxide and water is accomplished.

In contrast, combusting a stream of diluted hydrocarbon of low heating value in contact with a platinum oxidation catalyst and an insufficient, that is substoichiometric, amount of air cannot result in complete combustion of the hydrocarbon to carbon dioxide and water. Theoretically, such incomplete combustion could lead to a combination of some or all of the following chemical species: carbon dioxide, carbon monoxide, water, unreacted hydrocarbon, hydrogen, free carbon and partially oxidized hydrocarbon, such as methanol and formaldehyde in the case of methane, in addition to the nitrogen from the air. We have carried out such experiments on a hydrocarbon-containing gas stream of low heating value with a substoichiometric amount of oxygen and have not identified any significant amount of free carbon or any partially oxidized hydrocarbon in the product stream following such partial combustion. Therefore, according to our study the only combustibles present in this partially combusted gas stream are carbon monoxide, hydrogen and unreacted hydrocarbon.

As used herein, air equivalence ratio, or A.E.R., is the ratio of the amount of air used in the partial combustion to the amount of air required at the same conditions of pressure and temperature for stoichiometric combustion of all combustible components in the gas stream (the denominator of this ratio being 1.0 is not expressed).

We have discovered that a gas stream having a maximum heating value of about 200 Btu/scf. can be combusted by substoichiometric combustion at an air equivalence ratio no higher than about 90 percent of the amount of air required for stoichiometric combustion and that the heat energy of the combusted gas can be effectively utilized such as by expanding it in a gas turbine to convert the heat energy to mechanical energy for performing work. The substoichiometric combustion is carried out in the presence of a suitable oxidation catalyst. A supported platinum catalyst is preferred because platinum is both a highly active oxidation catalyst and is also relatively sulfur tolerant. Many waste gas streams contain relatively low concentrations of hydrogen sulfide sufficient to poison a sulfur-sensitive catalyst. Other oxidation catalyst can also be used but are less desirable than a platinum catalyst, such as ruthenium, palladium, rhodium, osmium, iridium, vanadium, cobalt, nickel, iron, copper, manganese, chromium, molybdenum, titanium, silver, cerium, and the like. Suitable mixtures of the oxidation catalysts can also be used.

If it is desired to reduce the carbon monoxide content of the combusted gas stream for environmental reasons, a final clean-up system of a conventional type can be utilized. Or a platinum and cocatalyst combination can be used of the type described in our copending patent application Ser. No. 921,329, filed July 3, 1978, now U.S. Pat. No. 4,191,733. As described in this earlier filed patent application, the carbon monoxide level in the substoichiometric combustion of low heating value gas streams can be substantially reduced by the use of a cocatalyst selected from Groups IA, II, III, VIIB and VIII through atomic No. 45, the lanthanides, chromium, silver, tin and antimony with the platinum oxidation catalyst.

The low heating value gas streams which can be substoichiometrically combusted in our method generally comprise one or more hydrocarbons diluted with a non-combustible gas. The hydrocarbon component can be a single hydrocarbon such as methane, or it can be a mixture of hydrocarbons having from one to about seven carbon atoms. Additionally, small amounts of non-hydrocarbon combustible gases can also be present including carbon monoxide, hydrogen sulfide and hydrogen. The non-combustible component will generally be nitrogen, carbon dioxide or mixtures of these two gases, and it may frequently contain water vapor.

A mixture of diluted gaseous paraffinic hydrocarbons will react at different rates when burned in a deficiency of air. The higher paraffinic hydrocarbons burn readily while the lower the number of carbon atoms in the molecular structure the more resistant to combustion is the hydrocarbon. As a demonstration of this variable combustibility, a nitrogen-diluted two weight percent mixture of one to five carbon paraffinic hydrocarbons was burned in a combustion furnace with fifty percent of the stoichiometric amount of air for complete combustion. The gas, heated to 840° F. and passed in contact with a supported platinum oxidation catalyst, reached a maximum temperature of 1430° F. In this combustion experiment 100 percent of the n-pentane was converted, 54.5 percent of the n-butane, 44.1 percent of the propane, 31.8 percent of the ethane and 11 percent of the methane. This demonstrates that partial combustion of a gaseous hydrocarbon mixture including methane will substantially increase the proportion of methane in the product gas. This is fortuitous since methane is not regarded as a pollutant when discharged into the atmosphere in moderate amounts. This benefit is particularly marked when methane is the primary combustible component of the waste gas stream, since the higher hydrocarbons will be substantially eliminated.

Hydrogen sulfide will form sulfur dioxide as a combustion product which is itself controlled as a pollutant, therefore, its significant presence in the waste gas is undesired. The presence of hydrogen sulfide affects the catalyzed combustion reaction in several respects including a lowering in the overall conversion of hydrocarbons and an increase in the temperature required for the maintenance of continuous combustion. For these reasons, the amount of hydrogen sulfide in the waste gas stream undergoing substoichiometric combustion is desirably no more than about two weight percent and preferably a maximum of about 0.5 weight percent.

The waste gas stream can be the liquids-free flue gas obtained from subterranean in situ combustion processes for the recovery of hydrocarbons from carbonaceous deposits such as petroleum reservoirs, tar sands, oil shale formations and the like. The hydrocarbon component in this flue gas subsequent to the recovery of condensibles, in general, will primarily be methane with decreasing amounts of the higher hydrocarbons up to about the six carbon hydrocarbons. Small amounts of carbon monoxide, hydrogen and hydrogen sulfide are expected constituents of this flue gas. The gas stream can also suitably be a hydrocarbon-containing factory waste gas stream resulting from solvent evaporation, or the incomplete combustion of a carbonaceous fuel, and the like. The waste gas stream can also be a low heating value producer gas stream containing hydrogen and carbon monoxide as its major or only combustibles.

As described, the combustion process of our invention relates to the catalyzed combustion of low heating value gas streams with insufficient oxygen for complete combustion. It is also possible and generally desirable to preheat the gas stream if it is of such low heating value that it will not support combustion when it is at ambient temperature (that is about 25° C.), even in the presence of an oxidation catalyst. In this instance the preferred means of preheating the waste gas stream, either together with or in the absence of the air for combustion, is by heat exchange with the hot combusted gas stream. In a two-stage combustion process the waste gas stream is preferably preheated by exchange with the combusted gas exiting from the first stage.

The temperature of the combusted gas stream available for preheating is dependent on a number of factors including the heating value of the gas stream undergoing combustion, the amount of air that is used for combustion and the temperature to which the feed gas stream is preheated. The temperature to which the gas is preheated is not critical other than it be sufficiently high to support combustion under the particular conditions involved. The pressure present in the combustion zone also is not critical, varying from about atmospheric up to about 2,000 psi., more generally up to about 500 psi.

With these various conditions and variables in mind, the gas streams, which can be combusted to advantage by the herein-described catalytic procedure, will have a heating value of at least about 5, more preferably at least about 15 and most preferably at least about 30 Btu/scf. (one British thermal unit per standard cubic foot equals 9.25 kilocalories per cubic meter). The maximum heating value of the gas stream undergoing combustion by our process will be about 200, more generally a maximum of about 150, and most likely a maximum heating value of about 100 Btu/scf.

The oxidation catalyst that is used in our substoichiometric combustion process is desirably carried on an inert support. Since the catalytic combustion inherently involves a relatively large volume of the stream of low heating value gas, the support is preferably of a design to permit good solid-gas contact at relatively low pressure drop. A suitable support can be formed as a monolith with hexagonal cells in a honeycomb design. Other cellular, relatively open-celled designs are also suitable.

The support for the catalysts to be used in the process of this invention can be any of the refractory oxide supports well known in the art, such as those prepared from alumina, silica, magnesia, thoria, titania, zirconia, silica-aluminas, silica-zirconias, magnesia-aluminas, and the like. Other suitable supports include the naturally occurring clays, such as diatomaceous earth. Additional desirable supports for use herein are the more recently developed corrugated ceramic materials made, for example, from alumina, silica, magnesia, and the like. An example of such material is described in U.S. Pat. No. 3,255,027 and is sold by E. I. duPont de Nemours & Company as Torvex. More recently, metallic monoliths have been fabricated as catalyst supports and these may be used to mount the catalytic material. An example of these supports is Fecralloy manufactured by Matthey Bishop, Inc. under U.S. Pat. Nos. 3,298,826 and 3,920,583.

If desired, the catalyst and cocatalyst, if used, can be mounted directly onto the surface of the monolith. Or the monolith can first be coated with a refractory oxide, such as defined above, prior to the deposition of these materials. The addition of the refractory oxide coating allows the catalyst to be more securely bound to the monolith and also aids in its dispersion on the support. These coated monoliths possess the advantage of being easily formed in one piece with a configuration suitable to permit the passage of the combustion gases with little pressure drop. The surface area of the monolith generally is less than one square meter per gram. However, the coating generally has a surface area of between about ten and about 300 $m^2/g$. Since the coating is generally about ten percent of the coated support, the surface area of the coated support will therefore generally be between about one and about 30 m$^2$/g.

In preparing the platinum and cocatalyst combination it is preferred that the cocatalyst be placed on the support before the platinum. However, the reverse order of emplacement is also suitable or the platinum and cocatalyst can be added in a single step. In the preferred procedure a suitable salt of the cocatalyst metal is dissolved in a solvent, preferably water. The support is impregnated with the solution of the cocatalyst metal. In a preferred embodiment the impregnated support is next gassed with a suitable gas, generally ammonia or hydrogen sulfide, to cause the catalyst metal to precipitate uniformly on the support as the hydroxide or sulfide as the case may be. It is then dried and calcined in air at about 800° to 1200° F., preferably at about 1000° F. Hydrogen may be used to reduce the cocatalyst compound to the metal if desired.

Platinum is impregnated onto the support, either alone or in association with a cocatalyst as an aqueous solution of a water-soluble compound such as chloroplatinic acid, ammonium chloroplatinate, platinum tetramine dinitrate, and the like. The catalyst is then gassed with hydrogen sulfide in a preferred embodiment to cause precipitation of the platinum as the sulfide to ensure uniform distribution of the platinum on the support. It is again dried and then calcined in air at about 800° to 1200° F., preferably at about 1000° F. The same general procedure can be used for the incorporation of a different oxidation catalyst on the support. In general, it is not certain whether calcination converts the catalyst metal sulfides and hydrated sulfides to another compound or how much is converted to the oxide, sulfite or sulfate, or to the metal itself. Nevertheless, for convenience, the noble metals such as platinum are reported as the metal and the other catalyst metals are reported as the oxide.

The supported catalyst is prepared so that it contains between about 0.005 and about 20 weight percent of the catalyst metal reported as the oxide, and preferably between about 0.1 and about 15 weight percent of the metal oxide. The platinum or other noble metal is used in an amount to form a finished supported catalyst containing between about 0.005 and about ten weight percent of the metal, and preferably about between 0.01 and about seven weight percent of the metal. When the platinum and cocatalyst combination is used for lowered carbon monoxide content in the product gas stream, the relative amount of the cocatalyst and the platinum has an effect on the combustion, including an effect in the amount of carbon monoxide in the combusted gas. The catalyst will broadly contain a mol ratio of cocatalyst as the oxide to platinum as the metal of between about 0.01:1 and about 200:1, preferably between about 0.1:1 and about 100:1, and most preferably between about 0.5:1 and about 50:1.

The gas stream of low heating value, such as a waste gas stream, can contain one or more hydrocarbons having from one to about seven carbon atoms, including aliphatic, alicyclic and aromatic hydrocarbons. But as indicated, the gas stream can also contain other combustibles including carbon monoxide and hydrogen. Although the combustible component of the low heating value gas stream will generally contain at least about fifty mol percent of aliphatic hydrocarbons and frequently at least about ninety mol percent of these aliphatic hydrocarbons, it can also be free of these hydrocarbons, such as a dilute producer gas containing only hydrogen and carbon monoxide in equal molar amounts. In the substoichiometric combustion of these various low heating value gas streams, the air equivalence ratio will be at least about 0.20 and preferably at least about 0.35 and a maximum of about 0.90 and preferably a maximum of about 0.80.

DESCRIPTION OF PREFERRED EMBODIMENTS

The reactor used in the following experiments, at atmospheric pressure was a one-inch I.D. forged steel unit which was heavily insulated to give adiabatic reaction conditions. The reactor used in the combustion under pressure was made from Incoloy 800 alloy (32 percent Ni, 46 percent Fe and 20.5 percent Cr) but was otherwise the same. The catalyst consisted of three one-inch monoliths wrapped in a thin sheet of a refractory material (Fiberfrax, available from Carborundum Co.). The catalyst compositions, as specified, are only approximate because they are based on the composition of the impregnating solution and the amount absorbed and are not based on a complete chemical analysis of the finished catalyst. Well insulated preheaters were used to heat the gas stream before it was introduced into the reactor. The temperatures were measured directly before and after the catalyst bed to provide the inlet and outlet temperatures. An appropriate flow of preheated nitrogen and air was passed over the catalyst until the desired feed temperature was obtained.

Preheated hydrocarbon was then introduced at a gas hourly space velocity of 42,000 per hour on an air-free basis and combustion was allowed to proceed until steady state conditions were reached. The feed gas stream contained 94.5 mol percent nitrogen, 3.75 mol percent methane, 0.98 mol percent ethane, 0.77 mol percent propane and 400 ppm. hydrogen sulfide, except where otherwise noted. The heating value of this feed stream is about 75 Btu/scf. The experiments were conducted at atmospheric pressure or at a slightly elevated pressure, except where otherwise noted. The analyses were made after steady state conditions were reached on a water-free basis. The conversion is the overall conversion of all hydrocarbon constituents. No measurable free oxygen occurred in the product gas stream.

EXAMPLE 1

A catalyst was made containing about 0.3 percent platinum on a Torvex support. The support was a mullite ceramic in the shape of a honeycomb having a coating of alumina of about 25 m$^2$/g. surface area. The support was soaked in an aqueous solution of chloroplatinic acid containing 23 mg. of platinum per ml. for 15 minutes. After removing excess solution from the support material, it was gassed with hydrogen sulfide for about 30 minutes to precipitate the platinum as platinum sulfide. The catalyst was then dried at 120° C. and calcined at 1000° F. (538° C.). The operating data over a series of air equivalence ratios are set out in Table I.

TABLE I

| Run | AER | Temperature, °F. Inlet | Outlet | Conv. % |
|---|---|---|---|---|
| 1[a] | 0.2 | 700 | 943 | 19.3 |
| 2 | 0.3 | 650 | 1062 | 23.3 |
| 3 | 0.4 | 650 | 1148 | 42.1 |
| 4[a] | 0.5 | 650 | 1236 | 57.3 |
| 5 | 0.6 | 650 | 1315 | 71.4 |
| 6[a] | 0.7 | 650 | 1415 | 81.5 |

TABLE I-continued

| Run | AER | Temperature, °F. Inlet | Temperature, °F. Outlet | Conv. % |
|---|---|---|---|---|
| 7 | 0.8 | 650 | 1596 | — |

[a]Average of 2 runs on different days.

EXAMPLE 2

A catalyst was made by the general impregnation technique as described in Example 1 but in two stages to contain tin calculated as about 1.0 percent tin oxide, $SnO_2$, and about 0.3 percent platinum. The operating data over a series of air equivalence ratios are set out in Table II.

TABLE II

| Run | AER | Temperature, °F. Inlet | Temperature, °F. Outlet | Conv. % |
|---|---|---|---|---|
| 8 | 0.2 | 745 | 1069 | 19.9 |
| 9 | 0.3 | 649 | 1170 | 27.8 |
| 10 | 0.4 | 649 | 1297 | 37.5 |
| 11 | 0.5 | 649 | 1413 | 44.8 |
| 12 | 0.6 | 649 | 1519 | 56.2 |
| 13[a] | 0.7 | 649 | 1619 | 70.5 |
| 14[a] | 0.8 | 650 | 1786 | 91.3 |

[a]Average of 2 runs on different days.

EXAMPLE 3

A series of catalysts were prepared by the two-stage procedure used in Example 2 and tested to illustrate the effect of the cocatalyst combination in carbon monoxide reduction. Many of these catalysts were tested at different air equivalence ratios and it was found that the maximum carbon monoxide occurred at an A.E.R. of about 0.7 when a cocatalyst was used with platinum. This contrasts with maximum carbon monoxide occurring at an A.E.R. of 0.6 when no cocatalyst is used with platinum.

Table III summarizes a series of experiments by setting forth the results of various catalytic combinations at an A.E.R. of 0.7 for the two-component catalysts, and an A.E.R. of 0.6 for the platinum-only catalysts. All runs were carried out at an inlet temperature of 649°–650° F. The catalysts contained approximately 0.3 weight percent platinum, except where specially noted.

TABLE III

| Run | Cocatalyst | Outlet °F. | CO mol % | $CO_2$ mol % | Conv. % |
|---|---|---|---|---|---|
| 15[a] | — | 1285 | 2.85 | 1.59 | 76.3 |
| 5 | — | 1315 | 2.42 | 1.79 | 71.4 |
| 16[b] | 0.7%$Fe_2O_3$ | 1599 | 1.15 | 3.00 | 70.5 |
| 17[b] | 0.5%$SnO_2$ | 1607 | 1.12 | 3.18 | 72.4 |
| 18 | 1%CoO | 1625 | 0.85 | 3.09 | 72.0 |
| 19 | 1%CaO | 1642 | 0.83 | 2.96 | 67.6 |
| 20[b] | 3%$SnO_2$ | 1616 | 0.68 | 3.32 | 69.2 |
| 21 | 1%NiO | 1652 | 0.48 | 3.34 | 68.2 |
| 22 | 1%$Sb_2O_3$ | 1684 | 0.46 | 3.40 | 65.8 |

[a]0.5% platinum.
[b]Average of 2 runs on different days.

EXAMPLE 4

Data for a further series of bimetallic catalysts that were unsuccessfully tested at an air equivalence ratio of 0.7 are set out in Table IV. All of the catalysts contained approximately 0.3 weight percent platinum except where indicated otherwise.

TABLE IV

| Run | Cocatalyst | Pt | Inlet Temp. °F. | Conv. % |
|---|---|---|---|---|
| 23[a] | CuO | 0.3% | 770 | — |
| 24[a] | 1%$Bi_2O_3$ | 0.3% | 770 | — |
| 25[a] | 1%$V_2O_5$ | 0.3% | 732 | — |
| 26[a] | 0.3%CuO+ 0.3%$Cr_2O_3$ | 0.3% | 750 | — |
| 27[b] | 0.3%CuO+ 0.3%$Cr_2O_3$ | none | 650 | — |
| 28[b] | 1%PbO | 0.3% | 649 | — |

[a]Unstable combustion, steady state combustion never reached.
[b]No combustion.

The data in this table show that some metals that are known to be effective oxidation catalysts are not effective as cocatalysts with platinum in the present substoichiometric process. For example, copper oxide, vanadium oxide, lead oxide and copper chromite are recognized as oxidation catalysts. In contrast, tin oxide which is shown in Table III to be an effective suppressor of carbon monoxide with a platinum oxidation catalyst in substoichiometric combustion, is not itself effective as an oxidation catalyst.

EXAMPLE 5

In this experiment a different low heating value gas stream containing higher hydrocarbons and carbon monoxide was used. It contained 5.5 volume percent of a hydrocarboncarbon monoxide mixture which comprised 67.89 mol percent methane, 7.76 percent ethane, 5.83 percent propane, 7.73 percent n-butane, 5.04 percent n-pentane, 0.96 percent n-hexane and 4.79 mol percent carbon monoxide. The remainder was nitrogen and 400 ppm. hydrogen sulfide. The catalyst, containing about 0.5 percent platinum on an alumina-coated Torvex support, was the same as the catalyst used in Run 15. The operating data over a series of air equivalence ratios are set out in Table V.

TABLE V

| Run | AER | Temperature, °F. Inlet | Temperature, °F. Outlet | Conv. % |
|---|---|---|---|---|
| 29 | 0.2 | 650 | 925 | 18.3 |
| 30 | 0.3 | 650 | 1047 | 25.9 |
| 31 | 0.4 | 650 | 1150 | 36.9 |
| 32 | 0.5 | 650 | 1234 | 59.2 |
| 33[a] | 0.6 | 650 | 1318 | 81.3 |
| 34 | 0.7 | 650 | 1409 | 85.7 |
| 35 | 0.8 | 650 | 1555 | ~100 |

[a]Average of 2 runs on different days.

EXAMPLE 6

A series of runs were carried out under pressure using an inlet pressure to the reactor of 90 psia. The catalyst again contained about 0.5 percent platinum on an alumina-coated Torvex support. The operating data over a series of air equivalence ratios are set out in Table VI.

TABLE VI

| Run | GHSV $10^{-3}hr.^{-1}$ | AER | Temperature, °F. Inlet | Temperature, °F. Outlet | Conv. % |
|---|---|---|---|---|---|
| 36 | 20 | 0.4 | 650 | 1127 | 38.6 |
| 37 | 42 | 0.4 | 390 | 1146 | 36.3 |
| 38 | 80 | 0.4 | 500 | 1282 | 37.9 |
| 39 | 100 | 0.4 | 500 | 1329 | 36.6 |
| 40[a] | 15 | 0.42 | 500 | 1075 | 40.8 |
| 41 | 100 | 0.5 | 500 | 1424 | 49.9 |

TABLE VI-continued

| Run | GHSV 10⁻³hr.⁻¹ | AER | Temperature, °F. Inlet | Outlet | Conv. % |
|---|---|---|---|---|---|
| 42[b] | 25 | 0.61 | 650 | 1192 | 66.5 |

[a]Gas contained 5.27 percent hydrocarbon and 72 Btu/scf.
[b]Gas contained 3.7 percent hydrocarbon and 51 Btu/scf.

EXAMPLE 7

Another series of runs were carried out at a pressure of 90 psia. in the combustion reactor using a catalyst containing about 0.3 percent platinum and about one percent cobalt oxide. The operating data over a series of air equivalence ratios are set out in Table VII.

TABLE VII

| Run | GHSV 10⁻³hr.⁻¹ | AER | Temperature, °F. Inlet | Outlet | Conv. % |
|---|---|---|---|---|---|
| 43[a] | 42 | 0.4 | 500 | 1233 | 35.2 |
| 44[a] | 100 | 0.4 | 500 | 1309 | 33.0 |
| 45 | 42 | 0.4 | 430 | 1172 | — |
| 46[b] | 42 | 0.4 | 500 | 1235 | 33.3 |
| 47 | 80 | 0.4 | 500 | 1340 | 33.1 |
| 48[c] | 140 | 0.4 | 500 | 1291 | 32.4 |
| 49 | 80 | 0.6 | 500 | 1532 | 53.9 |
| 50[d] | 42 | 0.7 | 525 | 1446 | 65.4 |
| 51 | 42 | 0.7 | 650 | 1605 | 67.5 |
| 52 | 80 | 0.8 | 500 | 1760 | 72.1 |

[a]At 61 psia.
[b]Average of 2 runs on different days.
[c]Gas contained 5.37% hydrocarbon and 73 Btu/scf.
[d]Gas contained 5,000 ppm H₂S.

EXAMPLE 8

Several catalysts made by the general procedures described in Examples 1 and 2 were tested to determine the minimum temperature to which a feed gas stream must be heated to maintain continuous combustion. This temperature is designated the light off temperature (L.O.T.). The various light off temperatures as set out in Table VIII were obtained at an air equivalence ratio of 0.7 under the specific conditions of these runs after relatively steady state operation was apparently reached.

TABLE VIII

| Run | Pt, % | Other metal | L.O.T., °F. |
|---|---|---|---|
| 53 | 0.3 | — | 515 |
| 54 | 0.3 | 1% CoO | 535 |
| 55 | 0.3 | 1% Sb₂O₃ | 560 |
| 56 | 0.3 | 1% SnO₂ | 590 |
| 57 | 0.3 | 1% NiO | 615 |
| 58 | 0.3 | 1% CaO | 650 |

Since the light off temperature is an indicator of the relative oxidation activity of a catalyst, the lower the light off temperature the more active the catalyst.

The waste gas stream combusted in accordance with the substoichiometric conditions of the present process can be used as a source of heat for operating a boiler and the like, but a particularly suitable use is the utilization of the combusted gas stream as a source of motive power for driving a gas turbine. In this latter use, the combustion is carried out at an elevated pressure of about 75 psi. or higher so that the combusted gas stream can expand in the turbine as described in the following example.

EXAMPLE 9

A waste gas stream with a hydrocarbon composition of 3.75 mol percent methane, 0.98 mol percent ethane and 0.77 mol percent propane and containing 400 ppm. of hydrogen sulfide, the remainder being nitrogen, is mixed with air at an air equivalence ratio of 0.7 to give a combustible blend. This gas mixture is heated to a temperature of 650° F. and is combusted by passing it at a pressure of 90 psia. over an oxidation catalyst in a combustion reactor at a gas hourly space velocity of 42,000 per hour. The catalyst is a bimetallic oxidation catalyst comprising about one percent cobalt oxide and about 0.3 percent platinum impregnated on an alumina-coated Torvex monolithic ceramic support. This combustion elevates the temperature of the combusted gas stream to 1605° F. This hot gas at a pressure of about 90 psia. is directed to a turbine assembly in which it is expanded and exhausted at atmospheric pressure and a temperature of 880° F. The energy converted by the expansion of the hot gas in the turbine is available at the turbine shaft in the amount of about 3,300 horsepower.

In some applications of the present process, the heating value of the waste gas stream will exhibit minor variations with time. For example, in the tertiary recovery of oil from subterranean oil bearing formations by in situ combustion, minor variations in the heating value of the flue gas are expected as an inherent feature of the recovery procedure. Thus, on an hourly or shorter time basis the heating value may vary such as to give a minimum heating value of 60 Btu/scf. and a peak heating value of 82 Btu/scf. over a 24 hour period for a cumulative average heating value of 72 Btu/scf. Therefore, the expression air equivalence ratio, as used herein, is intended to refer to the cumulative average heating value over a meaningful period of time such as, for example, a 12 or 24 hour period of operation.

Furthermore, when the waste gas of varying heating value is combusted for the purpose of driving a turbine, it is preferred that the air equivalence ratio be so selected that there is not a substantial excess of oxygen at any specific period of operation, i.e., at minimum heating value, in order to ensure that there is not a substantial drop in temperature of the combusted gas that is fed to the turbine.

If the variations in heating value over a period of time exhibit a substantial swing between the minimum and maximum values, it may be expedient to inject supplemental fuel into the waste gas stream during minimum values to decrease the extent of the swing. One particular advantage in the substoichiometric combustion of a low heating value gas stream with a constant stream of air is that it will result in a combusted gas of constant temperature that can be directly utilized in a gas fired turbine.

The substoichiometric combustion can be carried out in one or more combustion zones. If more than one combustion zone is utilized, such as would be involved in a series of two or more combustion chambers, each combustion zone will contain its own oxidation catalyst. In this multi-zone combustion, the same oxidation catalyst can be used in each combustion zone or a different oxidation catalyst can be used in each zone. When multi-combustion zone operation is utilized, the amount of air required for overall substoichiometric operation is approximately equally divided and introduced into each combustion zone. For example, when two combustion zones are used, a minimum of one-third and preferably about fifty percent of the total combustion air is introduced into each combustion zone.

It is to be understood that the above disclosure is by way of specific example and that numerous modifications and variations are available to those of ordinary skill in the art without departing from the true spirit and scope of the invention.

We claim:

1. A method for the recovery of energy from a gas stream which has a heating value that varies with time and has an average heating value in the range of about 5 to about 200 Btu/scf. and comprising a combustible component selected from carbon monoxide and up to about 50 mol percent hydrogen, the method which comprises the steps passing said gas stream admixed with a substantially constant rate of air for combustion at an overall average air equivalence ratio of between about 0.2 and about 0.9 in contact with an oxidation catalyst in at least one combustion zone at a temperature high enough to initiate and maintain combustion of said gas stream, and utilizing the heat energy produced in said gas stream by said combustion.

2. A method for the recovery of energy from a gas stream in accordance with claim 1 in which the combustible component comprises a mixture of carbon monoxide and hydrogen in equal molar amounts.

3. A method for the recovery of energy from a gas stream in accordance with claim 1 in which the gas stream contains up to about two weight percent hydrogen sulfide.

4. A method for the recovery of energy from a gas stream in accordance with claim 1 in which the catalyst contains between about 0.005 and about ten weight percent platinum on a support.

5. A method for the recovery of energy from a gas stream in accordance with claim 1 in which the catalyst contains between about 0.01 and about seven weight percent platinum on a support.

6. A method for the recovery of energy from a gas stream in accordance with claim 1 in which the average heating value of said gas stream is between about 15 Btu/scf. and about 150 Btu/scf.

7. A method for the recovery of energy from a gas stream in accordance with claim 1 in which the average heating value of said gas stream is between about 30 and about 100 Btu/scf.

8. A method for the recovery of energy from a gas stream in accordance with claim 1 in which the gas stream to the combustion zone is heated to combustion temperature by heat exchange with the combusted gas.

9. A method for the recovery of energy from a gas stream in accordance with claim 1 in which the gas stream following combustion is expanded in a gas turbine for the delivery of mechanical energy.

10. A method for the recovery of energy from a gas stream in accordance with claim 9 in which the pressure of the combusted gas stream fed to the gas turbine is at least about 75 psi.

11. A method for the recovery of energy from a gas stream in accordance with claim 9 in which the said gas stream and a portion of the air required for partial combustion is passed in contact with each of two oxidation catalysts in series in two stages.

12. A method for the recovery of energy from a gas stream in accordance with claim 11 in which at least one-third of said combustion air is added to the gas stream prior to combustion in each stage.

13. A method for the recovery of energy from a gas stream in accordance with claim 12 in which about fifty percent of said combustion air is added prior to each stage.

14. A method for the recovery of energy from a gas stream in accordance with claim 1 in which the air feed rate will not result in a substantial stoichiometric excess of oxygen during a period of minimum heating value.

* * * * *